March 21, 1944. E. S. COOK 2,344,851
VARIABLE LOAD BRAKE
Filed Sept. 30, 1942
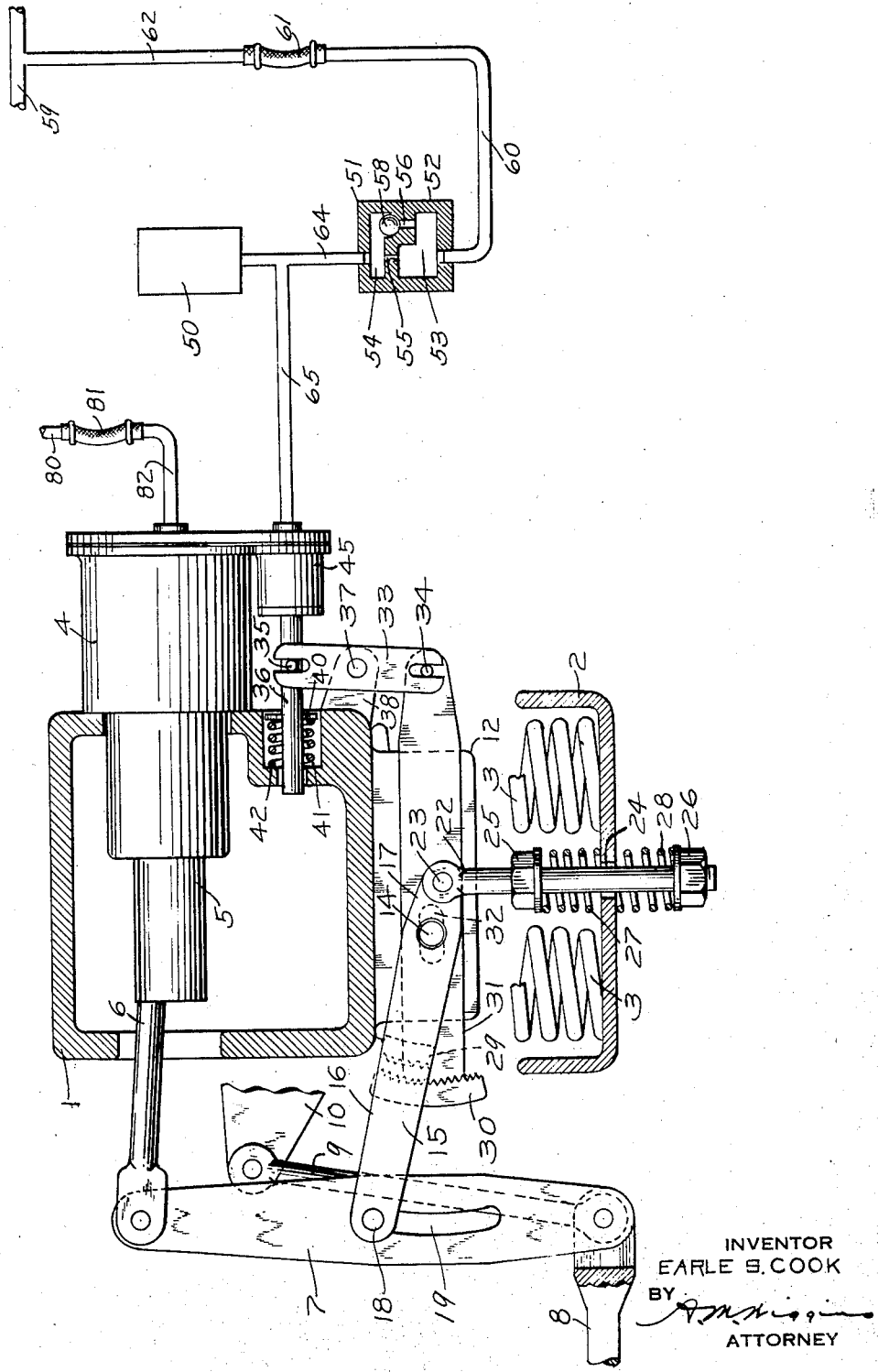
INVENTOR
EARLE S. COOK
BY
ATTORNEY Patented Mar. 21, 1944

2,344,851

UNITED STATES PATENT OFFICE 2,344,851

VARIABLE LOAD BRAKE

Earle S. Cook, Wilkinsburg, Pa., assignor to The Westinghouse Air Brake Company, Wilmerding, Pa., a corporation of Pennsylvania Application September 30, 1942, Serial No. 460,267

14 Claims. (Cl. 188—195)

This invention relates to railway vehicle brake rigging and more particularly to variable load brake rigging of the type in which the leverage thereof may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load brake apparatus of the above mentioned type including adjustment control means which is constructed and arranged to permit adjustment of the rigging only when the pressure of fluid in the brake pipe is reduced below a predetermined degree for a definite interval of time.

Other objects and advantages will appear in the following detailed description of the invention.

In the accompanying drawing the single figure is a diagrammatic view, partly in section, of a railway vehicle truck embodying the invention, parts of the truck and of the brake rigging not deemed essential to a clear understanding of the invention being omitted to more clearly illustrate certain details of the invention.

As shown in the drawing, the variable load brake apparatus is applied to a railway vehicle truck which may be of the usual well known construction having a truck bolster 1, laterally spaced side frames (not shown) and a spring plank 2 which is supported by the truck side frames in the usual manner and upon which the usual truck bolster supporting springs 3 seat.

The variable load brake apparatus comprises the usual brake cylinder device having a cylinder 4 which is rigidly secured to the truck bolster 1 and which contains the usual piston having a hollow push rod 5. The push rod projects beyond one end of the cylinder and rockably mounted in this rod is the usual push rod 6. The outer end of the push rod is operatively connected to the upper end of a vertically disposed brake cylinder lever 7, the lower end of the lever being operatively connected to one end of a longitudinally extending pull rod 8 leading to other brake rigging elements, not shown. The lower end of the brake cylinder lever 7 is also connected to one end of a brake hanger 9, which hanger, at its opposite end, is connected to a bracket 10 carried by a fixed or unsprung part of the truck, such for example as the truck side frames (not shown).

Rigidly carried by the underside of the bolster 1, and extending downwardly therefrom is a bracket 12 which carries a pin 14 upon which is rockably mounted a lever 15. At one side of the pin 14 the lever comprises an arm 16 and at the other side comprises an arm 17, the arm 16 being of greater length than the arm 17.

The outer end of the arm 16 carries a pin 18 which passes through a slotted opening 19 formed in and extending longitudinally of the brake cylinder lever 7 intermediate its ends, which pin serves as a fulcrum for the lever.

The outer end of the arm 17 is connected to one end of a vertically extending rod 22 by means of a pin 23, which rod extends through a suitable opening 24 provided in the spring plank 2. The rod 22 is provided with two adjustable spring seats, 25 and 26, in the form of nuts having screw-threaded engagement with the rod, and which are disposed adjacent the upper and lower sides of the spring plank, respectively.

Interposed between the spring seat 25 and the upper side of the spring plank 3 is a spring 27 and interposed between the spring seat 26 and the lower side of the spring plank is a spring 28.

The arm 16 of the lever 15 is provided at a point intermediate the pins 14 and 18 with a serrated or toothed locking portion or segment 29 which is adapted to be engaged by a correspondingly shaped toothed locking portion 30 which is carried at one end of a latch member 31. The latch member 31 extends transversely of the bolster and is preferably arranged parallel with the lower side thereof and is slidably mounted in the bracket 12 for longitudinal movement relative to the bolster. Intermediate its ends the latch member is provided with a slotted opening 32 through which the pin 14 extends. The other end of the latch member is operatively connected to the lower end of a vertically extending lever 33 by means of a pin 34. The lever 33 is operatively connected at its opposite end by means of a pin 35 to a horizontally extending operating rod 36 and is pivotally mounted intermediate its ends on a pin 37 carried by a bracket 38 projecting from the bolster 1.

The horizontally extending rod 36 is movable longitudinally to rock the lever 33 about the pivot pin 37 in either direction to actuate the locking element 30 into and out of locking engagement with the toothed portion 29 on the arm 16 of the lever 15.

At one side of the pin 35, the rod 36 is provided with a spring seat 40 which is slidably mounted in a bore 41 formed in the bolster 1. Interposed between one side of this spring seat and the inner wall of the bore there is a spring 42 which tends, at all times, to move the spring seat in a direction toward the lever 33. At the opposite side of the pin 35, the rod 36 is provided with a piston (not shown) which piston is contained in a reset cylinder 45 and is employed for actuating the spring seat 40 in a direction away from the lever 33 as will hereinafter more fully apper.

As shown in the drawing the apparatus further comprises a volume reservoir 50 and a check valve device 51. The check valve device 51 comprises a casing 52 in which there is provided a chamber 53 and a chamber 54 which chambers are connected together by way of a restricted passage 55 and an unrestricted passage 56, in which latter passage there is interposed a ball check valve 58 for a purpose hereinafter described.

The chamber 53 is in constant open communication with the usual brake pipe 59 by way of a pipe 60, a flexible hose 61 and a pipe 62, the flexible hose 61 being provided to accommodate relative movement between the sprung and unsprung parts of the vehicle.

The chamber 54 is connected to one end of a pipe 64 which pipe at its opposite end is connected to the volume reservoir 50. The pipe 64 is also connected to one end of a pipe 65 which is connected at its opposite end to the reset cylinder 45.

It is obvious that any variation in the position of the fulcrum pin 18 with relation to the brake cylinder lever 7 within the slotted opening 19 will result in a variation in the leverage ratio of the brake rigging and thereby a variation in the braking power of the brake rigging.

If the fulcrum pin 18 is moved longitudinally in a direction away from the brake cylinder the arm of the brake lever 7 to which the brake cylinder push rod 6 is connected, will be correspondingly lengthened, so that when the brake cylinder is operated the power transmitted by the opposite end of the lever to the pull rod 8 will be correspondingly increased. If the pin is moved from the lower end of the slotted opening in a direction toward the push rod 6 the power transmitted to the pull rod will be decreased.

*Operation*

Assuming the vehicle, embodying the invention, to be empty and separated from a train, the brakes on the vehicle released and the brake pipe of the vehicle deplete of fluid under pressure. Under these conditions the several parts of the apparatus will be in the position in which they are illustrated in the drawing.

When the empty vehicle is placed in a train, the brake pipe 59 will of course be supplied with fluid under pressure, the brake pipe throughout the train being fully charged to the normal pressure carried before the train is put in motion. Fluid under pressure supplied to the brake pipe 59 flows to the chamber 53 in the check valve device 51 by way of pipe 62 flexible hose 61 and pipe 60.

Fluid under pressure flows from chamber 53 in the check valve device 51 to chamber 54 by way of passage 56 past ball check valve 58 and by way of restricted passage 55. Fluid under pressure flows from chamber 54 through pipe 64 to the volume reservoir 50 and through the connected pipe 65 to the reset cylinder 45.

It will be understood that the rod 36 and thereby the lever 33 are maintained in the position shown in the drawing by the spring 42 until the pressure of fluid in the reset cylinder 45 has been increased to approximately 35 pounds, whereupon the piston contained therein will operate to actuate the rod 36 in a direction toward the left hand against the opposing pressure of the spring 42.

Movement of the rod 36 in this direction causes the attached lever 33 to rock in a counter-clockwise direction about the pivot pin 37, the lever actuating the latch member 31 in a direction toward the right hand. Movement of the latch member toward the right hand causes the locking element 30 carried, thereby to move into locking engagement with the toothed portion 29 on the lever 15, thus locking the lever and thereby maintaining the fulcrum pin 18 at the upper end of the slotted opening 19 until brake pipe pressure is again depleted below 35 pounds. With the fulcrum pin 18 thus locked in position the brake rigging is now conditioned for operation to provide the proper braking for the empty vehicle.

It should here be mentioned that when the vehicle is in transit and the fulcrum pin 18 is locked in any position within the slotted opening 19 by interengagement of the teeth on the locking element 30 and the portion 29 on the lever 15, the relative movement between the truck bolster 1 and the spring plank 2 will be cushioned by either the spring 27 or the spring 28, depending upon the direction of such movement. This spring cushioning arrangement will prevent excessively heavy shocks due to such relative movement from being imposed upon the lever and thereby upon the locking portions of the lever and the latch member.

When it is desired to effect an application of the brakes, fluid under pressure is supplied to the brake cylinder in the usual manner by way of a pipe 80, flexible hose 81 and pipe 82. Fluid under pressure thus supplied to the brake cylinder causes the push rod 6 to move in a direction toward the left hand from the position viewed in the drawing. As the push rod 6 moves in this direction it actuates the brake lever 7 in the usual manner to move the pull rod 8 to effect an application of the brakes.

Assuming now that, while the vehicle is separated from a train and the brake pipe deplete of fluid under pressure, lading is placed on the body of the vehicle. Under the influence of the additional weight which the lading imposes on the truck bolster 1, the bolster springs 3 will yield and permit the bloster and the body of the vehicle to move downwardly relative to the spring plank 2.

It should here be understood that the spring 27 has sufficient initial tension to resist deflection by the lever 15 upon relative movement between the bolster and the spring plank, so that the lever will be caused to rock in a counter-clockwise direction about the pin 23. This rocking movement of the lever 15 causes the arm 16 to move downwardly carrying the fulcrum pin 18 with it, the pin moving in the slotted opening 19 in the brake cylinder lever 7. From this it will be understood that the fulcrum pin 18 will be automatically positioned relative to the brake cylinder lever 7 to provide for the degree of braking called for by the weight of the lading carried by the vehicle.

Now when the loaded vehicle is placed in a train and the brake pipe charged with fluid under pressure to approximately 35 pounds, the reset cylinder 45 will again operate to cause the latch member 31 to move the locking element 30 into locking engagement with the toothed member 29 on the lever 15 in the same manner as already described in connection with empty braking. When the locking element 30 moves into locking engagement with the toothed portion 29 on the lever 15, the lever and thereby the fulcrum pin 18 are maintained and locked in the position to which they have been moved so as to maintain the brake rigging conditioned for operation to provide the proper braking.

In setting a car out of a train the usual hose couplings (not shown) between cars are parted which permits the brake pipe pressure to reduce rapidly to atmospheric pressure. This rapid reduction in brake pipe pressure causes any of the well known brake controlling valve devices, such for example, as the "AB" valve, shown and described in the Westinghouse Air Brake Co. Instruction Pamphlet No. 5062, acting in the usual manner, to supply fluid under pressure to the brake cylinder to effect an application of the brakes.

Since as hereinafter described the volume reservoir 50 and the reset cylinder 45 are connected to the brake pipe, a reduction in the pressure of fluid in the brake pipe will consequently effect a reduction in the pressure of fluid in the reservoir and reset cylinder.

Upon effecting a reduction in brake pipe pressure, fluid under pressure in pipe 64 and connected volume reservoir 50 and reset cylinder 45, flows to the atmosphere by way of chamber 54 in the check valve device 51, through restricted passage 55, chamber 53, pipe 60, flexible hose 61, pipe 62 and brake pipe 59. It will be noted that the ball check valve 58 operates at this time to prevent flow of fluid under pressure through passage 56 from chamber 54 to chamber 53 in the check valve device 51. Since the release of fluid under pressure from the reset cylinder 45 and connected volume reservoir 50 is at a restricted rate, the release of fluid under pressure from the reservoir and reset cylinder will be delayed for an interval of time. This delay in the release of fluid under pressure from the reset cylinder 45 is sufficient to insure the brake application being effective to bring the vehicle to a stop before the pressure in the reset cylinder is reduced sufficiently to permit the spring 42 to effect the unlocking operation of the latch member 31.

Now when the vehicle has been brought to a stop and the pressure of fluid in the reset cylinder 45 and volume reservoir 30 have been reduced a slight degree below the pressure of spring 42, said spring will operate to actuate the rod 36 in a direction toward the right hand. Movement of the rod 36 in this direction will cause the lever 33 to rock in a clockwise direction about the pivot pin 37 thereby causing the attached latch member 31 to move in a direction toward the left hand to the position in which it is shown in the drawing. With the latch member 31 moved to this position the locking element 30 is moved out of locking engagement with the toothed portion 29 on the lever 15, thus unlocking the lever and thereby the pin 18.

With the lever 15 and the pin 18 again unlocked it will be understood that any relative movement between the truck bolster 1 and the spring plank 2, due to variations in the weight of the load on the vehicle, will cause the brake rigging to be conditioned automatically to provide for the proper degree of braking.

Having now described my invention, what I claim as new and desire to secure by Letters Patent, is:

1. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum for said lever disposed in said slotted opening, means movable in response to relative movement between the fixed and the movable parts of the vehicle for shifting said fulcrum along the brake lever, fluid pressure responsive means operative upon the supply of fluid under pressure thereto to lock said means in any position to which it has been moved and operative upon the release of fluid under pressure therefrom to unlock said means, and means for restricting the release flow of fluid under pressure from said pressure responsive means.

2. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum for said lever disposed in said slotted opening, a lever carried by the movable part of the vehicle and operatively connected to said fixed part, said lever being operative in response to relative movement between said fixed and the movable parts of the vehicle for shifting said fulcrum, and fluid pressure responsive means operative upon the supply of fluid under pressure thereto to lock said lever and thereby said fulcrum in any adjusted position and operative upon the release of fluid under pressure therefrom to unlock said means.

3. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum for said lever disposed in said slotted opening, a lever carried by said movable part and operatively connected to the fixed part operative by relative movement between said movable and said fixed parts of the vehicle for shifting said fulcrum, a locking mechanism for locking said lever and thereby said fulcrum in its adjusted position, means responsive to fluid under pressure supplied thereto for effecting operation of said locking mechanism to lock said lever.

4. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum for said lever disposed in said slotted opening, a lever carried by said movable part and operatively connected to the fixed part operative by relative movement between said movable and said fixed parts of the vehicle for shifting said fulcrum, locking means for locking said lever and thereby said fulcrum in its adjusted position, and means responsive to a predetermined increase in fluid under pressure for effecting operation of said locking means to lock said lever.

5. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum for said lever disposed in said slotted opening, a lever carried by said movable part and operatively connected to the fixed part operative by relative movement between said movable and said fixed parts of the vehicle for shifting said fulcrum, locking means for locking said lever and thereby said fulcrum in its adjusted position, a brake pipe normally deplete of fluid under pressure, and means responsive to a predetermined increase in brake pipe pressure for effecting operation of said locking means to lock said lever.

6. In a variable load brake apparatus for a vehicle truck of the type having a fixed spring plank and a truck bolster vertically movable relative to the spring plank in response to variations in the weight imposed thereon, in combination, a brake lever operatively connected at one end to a brake member to be operated, a brake cylinder carried by said bolster and connected to the other end of said lever, said brake cylinder being operative to actuate the lever and thereby said member, a slotted opening in said lever extending longitudinally of the lever intermediate its ends, a fulcrum for said lever disposed in said slotted opening, a lever pivotally carried intermediate its ends by said bolster and operatively connected at one end to said spring plank, said lever being rockable about its pivot by the relative movement between said bolster and said spring plank for shifting said fulcrum along said brake lever, locking means comprising a toothed portion carried by said lever and a locking member carried by said bolster, said locking member being adapted to engage said toothed portion to lock said lever and thereby said fulcrum in its adjusted position, and fluid pressure responsive means operative upon a predetermined increase in fluid under pressure supplied thereto for moving said locking member into engagement with said toothed portion.

7. In a variable load brake apparatus for a vehicle, a brake lever operative for effecting an application of the vehicle brakes, a brake cylinder for actuating said lever, an adjustable fulcrum for said lever, said fulcrum having a position for providing empty vehicle braking and being movable therefrom to various other positions through a loaded vehicle zone for providing loaded vehicle braking, adjusting means movable in response to relative movement between a sprung and an unsprung part of the vehicle for positioning said fulcrum in said loaded vehicle zone, locking means for locking said adjusting means and thereby said fulcrum in any position to which it has been moved, fluid pressure responsive means operative upon the supply of fluid under pressure thereto to effect the operation of said locking means to lock said adjusting means and operative upon the release of fluid under pressure therefrom to effect operation of said locking means to unlock said adjusting means, and means for controlling the release of fluid under pressure from said fluid pressure responsive means said means being operative to delay the operation of said locking means to unlock said adjusting means for a predetermined interval of time following the initiation of the release of fluid under pressure from said fluid pressure responsive means.

8. In a variable load brake apparatus for a vehicle, a brake lever operative for effecting an application of the vehicle brakes, a brake cylinder for actuating said lever, an adjustable fulcrum for said lever, said fulcrum having a position for providing empty vehicle braking and being movable therefrom to various other positions through a loaded vehicle zone for providing loaded vehicle braking, adjusting means movable in response to relative movement between a sprung and an unsprung part of the vehicle for positioning said fulcrum in said loaded vehicle zone, a brake pipe normally deplete of fluid under pressure, fluid pressure responsive means operative upon a predetermined increase in fluid under pressure in the brake pipe for locking said adjusting means in any position to which it has been adjusted and operative upon a reduction in brake pipe pressure below said predetermined pressure for unlocking said adjusting means, and means interposed between said brake pipe and said fluid pressure responsive means for delaying for a chosen interval of time the operation of said fluid pressure responsive means upon a reduction in brake pipe pressure.

9. In a variable load brake apparatus for a vehicle, a brake lever operative for effecting an application of the vehicle brakes, a brake cylinder for actuating said lever, an adjustable fulcrum for said lever, said fulcrum having a position for providing empty vehicle braking and being movable therefrom to various other positions through a loaded vehicle zone for providing loaded vehicle braking, adjusting means movable in response to relative movement between a sprung and an unsprung part of the vehicle for positioning said fulcrum in said loaded vehicle zone, a brake pipe normally deplete of fluid under pressure, fluid pressure responsive means operative upon a predetermined increase in fluid under pressure in the brake pipe for locking said adjusting means in any position to which it has been adjusted and operative upon a reduction in brake pipe pressure below said predetermined pressure for unlocking said adjusting means, and means interposed between said brake pipe and said fluid pressure responsive means for delaying for a predetermined interval of time, the operation of said fluid pressure responsive means upon a reduction in brake pipe pressure.

10. In a variable load brake apparatus for a vehicle, a brake lever operative for effecting an application of the vehicle brakes, a brake cylinder for actuating said lever, an adjustable fulcrum for said lever, said fulcrum having a position for providing empty vehicle braking and being movable therefrom to various other positions through a loaded vehicle zone for providing loaded vehicle braking, adjusting means movable in response to relative movement between a sprung and an unsprung part of the vehicle for positioning said fulcrum in said loaded vehicle zone, a brake pipe normally deplete of fluid under pressure, fluid pressure responsive means operative upon a predetermined increase in fluid under pressure in the brake pipe for locking said adjusting means in any position to which it has been adjusted and operative upon a reduction in brake pipe pressure below said predetermined pressure for unlocking said adjusting means, and means including a reservoir and a choke for delaying for a predetermined interval of time the operation of said fluid pressure responsive means upon a reduction in brake pipe pressure.

11. In a variable load brake apparatus for a vehicle, a brake lever operative for effecting an application of the vehicle brakes, a brake cylinder for actuating said lever, an adjustable fulcrum for said lever, said fulcrum having a position for providing empty vehicle braking and being movable therefrom to various other positions through a loaded vehicle zone for providing loaded vehicle braking, adjusting means movable in response to relative movement between a sprung and an unsprung part of the vehicle for positioning said fulcrum in said loaded vehicle zone, a brake pipe normally deplete of fluid under pressure, fluid pressure responsive means operative upon a predetermined increase in fluid under pressure in the brake pipe for locking said adjusting means in any position to which it has been adjusted and operative upon a reduction in brake pipe pressure below said predetermined pressure for unlocking said adjusting means, a communication through which fluid under pressure is supplied from the brake pipe to said fluid pressure responsive means upon an increase in fluid under pressure, a ball check in said communication for preventing the flow of fluid under pressure from said fluid pressure responsive means to said brake pipe upon a reduction in pressure in the brake pipe, and a restricted passage through which fluid under pressure may flow from the fluid pressure responsive means to said brake pipe for delaying for an interval of time the operation of said fluid pressure responsive means upon a reduction in brake pipe pressure.

12. In a variable load brake apparatus for a vehicle, the combination with a brake rigging, motor means for controlling the operation of said rigging to apply and release the brakes and means responsive to variations in the weight of the load carried by the vehicle for adjusting the rigging to provide varying degrees of braking for any given force applied by said motor means, of locking means operative to lock the adjusting means in any adjusted position and being operative to an unlocking position, fluid pressure responsive means operative upon the supply of fluid under pressure thereto to effect the operation of said locking means to lock said adjusting means and operative upon the release of fluid under pressure therefrom to effect operation of said locking means to unlock said adjusting means, and means for controlling the release of fluid under pressure from said fluid pressure responsive means, said means being operative to delay the operation of said locking means to unlock said adjusting means for a predetermined interval of time following the initiation of the release of fluid under pressure from said fluid pressure responsive means.

13. In a variable load brake apparatus for a vehicle, the combination with a brake rigging, motor means for controlling the operation of said rigging to apply and release the brakes and means responsive to variations in the weight of the load carried by the vehicle for adjusting the rigging to provide varying degrees of braking for any given force applied by said motor means, of a brake pipe normally deplete of fluid under pressure, fluid pressure responsive means operative upon a predetermined increase in fluid under pressure in the brake pipe for locking said adjusting means in any position to which it has been adjusted and operative upon a reduction in brake pipe pressure below said predetermined pressure for unlocking said adjusting means, and means interposed between said brake pipe and said fluid pressure responsive means for delaying for a chosen interval of time, the operation of said fluid pressure responsive means upon a reduction in brake pipe pressure.

14. In a variable load brake apparatus for a vehicle, the combination with a brake rigging, motor means for controlling the operation of said rigging to apply and release the brakes and adjusting means responsive to variations in the weight of the load carried by the vehicle for adjusting the rigging to provide varying degrees of braking for any given force applied by said motor means, of fluid pressure responsive means operative upon the supply of fluid under pressure thereto to lock said adjusting means in any position to which it has been moved and operative upon the release of fluid under pressure therefrom to unlock said means, and means for restricting the release flow of fluid under pressure from said pressure responsive means.

EARLE S. COOK.